(12) United States Patent
Park

(10) Patent No.: US 11,298,824 B2
(45) Date of Patent: Apr. 12, 2022

(54) ROBOT SYSTEM AND CONTROL METHOD THEREOF

(71) Applicant: LG ELECTRONICS INC., Seoul (KR)

(72) Inventor: Ji Yoon Park, Gyeonggi-do (KR)

(73) Assignee: LG ELECTRONICS INC., Seoul (KR)

(*) Notice: Subject to any disclaimer, the term of this patent is extended or adjusted under 35 U.S.C. 154(b) by 390 days.

(21) Appl. No.: 16/577,814

(22) Filed: Sep. 20, 2019

(65) Prior Publication Data

US 2020/0406459 A1 Dec. 31, 2020

(30) Foreign Application Priority Data

Jun. 28, 2019 (KR) .......................... 10-2019-0077990

(51) Int. Cl.
  *B25J 9/16* (2006.01)
  *G05D 1/02* (2020.01)
  (Continued)

(52) U.S. Cl.
  CPC ........... *B25J 9/1661* (2013.01); *B25J 9/0084* (2013.01); *B25J 9/1602* (2013.01); *B25J 9/1679* (2013.01);
  (Continued)

(58) Field of Classification Search
  CPC ...... B25J 9/1661; B25J 9/0084; B25J 9/1602; B25J 9/1679; B25J 9/1697; B25J 11/008;
  (Continued)

(56) References Cited

U.S. PATENT DOCUMENTS

| 1,138,545 A | * | 5/1915 | Dennis | ............... B62D 33/0273 296/60 |
| 7,720,572 B2 | * | 5/2010 | Ziegler | ................. G16H 20/00 700/245 |

(Continued)

FOREIGN PATENT DOCUMENTS

| KR | 1020170110341 | 10/2017 |
| KR | 1020180123298 | 11/2018 |

*Primary Examiner* — Robert T Nguyen
(74) *Attorney, Agent, or Firm* — Lee, Hong, Degerman, Kang & Waimey PC

(57) ABSTRACT

Disclosed are a robot system and a control method for the same. The robot includes a first server, a first robot registered on the first server and configured to deliver goods to a client according to information received from the first server, a second robot configured to receive the delivery goods from the first robot, and a second server having the second robot registered thereon and being configured to operate the second robot. The control method for the robot system may include: confirming, by the first robot, whether a person is present in a surrounding area of delivery destination; when someone is present, acquiring, by the first robot, voice information and image information of the present person and transferring the same to the second robot; transferring, by the second robot, the voice information and the image information of the person to the second server; recognizing, by the second server, a person from at least one of the voice information and the image information of the person transferred from the second robot, and transferring a recognition result to the second robot; confirming, by the second robot, whether the present person is a family member of the client, based on the recognition result of the person transferred from the second server; and when the present person is a family member, transferring, by the first robot, the delivery goods to the present person.

17 Claims, 8 Drawing Sheets

(51) Int. Cl.
  *G06K 9/00* (2006.01)
  *B25J 19/02* (2006.01)
  *B25J 11/00* (2006.01)
  *B25J 9/00* (2006.01)
  *G10L 15/08* (2006.01)

(52) U.S. Cl.
  CPC ............ *B25J 9/1697* (2013.01); *B25J 11/008* (2013.01); *B25J 19/026* (2013.01); *G05D 1/021* (2013.01); *G06K 9/00221* (2013.01); *G10L 15/08* (2013.01)

(58) Field of Classification Search
  CPC ...... B25J 19/026; B25J 9/0009; B25J 9/1664; B25J 13/003; B25J 13/006; B25J 13/08; B25J 19/02; G06K 9/00221; G06K 9/00288; G06K 9/00671; G06K 9/6202; G10L 15/08; G10L 17/00; G06Q 10/0832; G05D 1/0027; G05D 1/0088; G05D 1/021
  See application file for complete search history.

(56) References Cited

U.S. PATENT DOCUMENTS

| | | | | |
|---|---|---|---|---|
| 9,643,320 B2* | 5/2017 | Davey | .................... | B25J 11/009 |
| 11,164,273 B2* | 11/2021 | Heinla | ............. | G05B 19/41895 |
| 11,185,989 B2* | 11/2021 | Ono | ....................... | B25J 9/0003 |
| 2021/0256709 A1* | 8/2021 | Madden | ............. | G06K 9/00362 |

* cited by examiner

ROBOT SYSTEM AND CONTROL METHOD THEREOF

CROSS-REFERENCE TO RELATED APPLICATION

Pursuant to 35 U.S.C. § 119(a), this application claims the benefit of an earlier filing date of and the right of priority to Korean Application No. 10-2019-0077990, filed on Jun. 28, 2019, the contents of which are incorporated by reference herein in their entirety.

BACKGROUND

1. Technical Field

Embodiments of the present disclosure relate to a robot system for use in delivery of delivery goods and a control method for the robot system.

2. Description of Related Art

Contents described in this section are merely to provide background information about embodiments, and do not constitute prior art.

The development and distribution of robots for enhancing convenience in daily life have been increasing rapidly in recent years. Accordingly, when a client has made a purchase of goods, rather than having the client directly receive the shipped goods, it may be possible to improve the convenience of the client by having a home robot, which is stationed at the client's residential address to assist in the daily life of the client, receive the delivered goods instead.

Further, the delivery of goods is being increasingly performed by delivery robots instead of conventional human operators, and such delivery of goods using delivery robots is becoming increasingly popular and commercialized.

Korean Patent Application Publication No. 10-2018-0123298 A discloses an invention for delivering, through a shipping robot apparatus, delivery goods transported to each delivery area by a delivery person, to an original shipping address.

However, the above Korean Patent Application Publication No. 10-2018-0123298 A does not describe the configuration of a home robot being stationed at the residential address of a client to assist the client, and thus has no description of interactions between a shipping robot delivering the delivery goods and the home robot.

Korean Patent Application Publication No. 10-2017-0110341 A describes an invention with a feature that allows an unmanned shipping robot to identify a user at the shipping address once the unmanned shipping robot reaches the user.

However, this invention requires the user to be located near the unmanned shipping robot, and further requires the active intervention of the user in receiving the delivered goods in person, thus causing inconvenience for the user.

SUMMARY OF THE INVENTION

One aspect of the present disclosure is to provide a robot system which enables smooth and efficient delivery of delivery goods between a first robot delivering the delivery goods and a second robot which is a home robot, and a control method for the robot system.

Another aspect of the present disclosure is to provide an appropriate measure in the event in which an unwanted intervention by an unintended person occurs during the delivery of delivery goods using robots.

Another aspect of the present disclosure is to provide an appropriate measure in the event in which a person interfering in the delivery of delivery goods represents a risk factor.

The present disclosure is not limited to the aspects described above, and other aspects not mentioned may be more clearly understood from the following description by a person skilled in the art to which the present disclosure pertains.

A robot system according to an embodiment of the present disclosure may be configured such that a server, a first robot, and a second robot interwork with one another.

The robot system according to this embodiment may include a first server, a first robot configured to deliver delivery goods to a client according to information received from the first server, a second robot configured to receive the delivery goods from the first robot, and a second server having the second robot registered thereon and being configured to operate the second robot.

When a person is present in the surrounding area of a delivery destination, said person may represent a risk factor if said person is a third party other than the client, a family member of the client, or an acquaintance of the client. In other words, the third party may intrude into the home of delivery destination, or seize the delivery goods. A robot system according to an embodiment proposes a measure to prevent such a risk in the event of a third party intervening at the delivery destination immediately before completion of the delivery.

Accordingly, in the robot system control method according to this embodiment, the first robot may search a surrounding area of the delivery destination to check whether a person is present, and when a person is present, the first robot may acquire at least one of voice information or image information of the present person, and transmit the same to the second robot. The second robot may transmit the at least one of the voice information or the image information of the person to the second server, and from the at least one of the voice information or the image information of the person received from the second robot, the second server may recognize a person and send a recognition result to the second robot.

Based on the recognition result of the person transmitted from the second server, the second robot may determine whether the present person is a family member of the client, and when the present person is a family member, the first robot may deliver the delivery goods to the present person.

In a robot system according to an embodiment, the second server may include an artificial intelligence module. The artificial intelligence module may compare the voice information transmitted from the second robot with voice data stored on the second server, and when a degree of similarity is greater than or equal to a set value, the artificial intelligence module may output information of a corresponding person as a recognition result, and the second server may transmit the recognition result to the second robot.

Further, the artificial intelligence module may compare the image information transmitted from the second robot with image data stored on the second server, and when a degree of similarity is greater than or equal to a set value, the artificial intelligence module may output information of a corresponding person as a recognition result, and the second server may transmit the recognition result to the second robot.

According to embodiments of the present disclosure, the first robot and the second robot may interwork with each other to perform actions in correspondence with each other over a course of time, thus enabling smooth and efficient delivery of delivery goods.

According to the embodiments, whether or not a person is present in the surrounding area of the delivery destination, the first robot and the second robot may operate in an appropriate manner for each circumstance, and thus time, costs, and effort associated with the delivery of the delivery goods may be reduced.

According to the embodiments, when a person is present in the surrounding area of the delivery destination, it is assessed whether said person poses a risk to the delivery of delivery goods and the safety of the client, and an effective response may be made based on the result of such assessment.

According to the embodiments, regardless of the presence or absence of the client at delivery destination, safe delivery of delivery goods may be achieved.

BRIEF DESCRIPTION OF THE DRAWINGS

The above and other aspects, features, and advantages of the present disclosure will become apparent from the detailed description of the following aspects in conjunction with the accompanying drawings, in which.

DETAILED DESCRIPTION

Hereinbelow, embodiments will be described in greater detail with reference to the accompanying drawings.

Advantages and features of the present disclosure and methods for achieving them will become apparent from the descriptions of aspects herein below with reference to the accompanying drawings. However, the present disclosure is not limited to the aspects disclosed herein but may be implemented in various different forms. The aspects are provided to make the description of the present disclosure thorough and to fully convey the scope of the present disclosure to those skilled in the art. It is to be noted that the scope of the present disclosure is defined only by the claims.

Although the terms first, second, third, and the like, may be used herein to describe various elements, components, regions, layers, and/or sections, these elements, components, regions, layers, and/or sections should not be limited by these terms. Furthermore, these terms such as "first," "second," and other numerical terms, are used only to distinguish one element from another element.

In the description of the embodiment, in the case in which it is described as being formed on "on" or "under" of each element, "on" or "under" includes two elements directly contacting each other or one or more other elements being indirectly formed between the two elements. In addition, when expressed as "on" or "under", it may include not only upwards but also downwards with respect to one element.

Further, it is also to be understood that the relational terms such as "top/upper portion/above" and "bottom/lower portion/below" as used below do not necessarily imply any physical or logical relationship or order between such entities or elements, but may be used to distinguish one entity or element from another entity or element.

Figure 1:
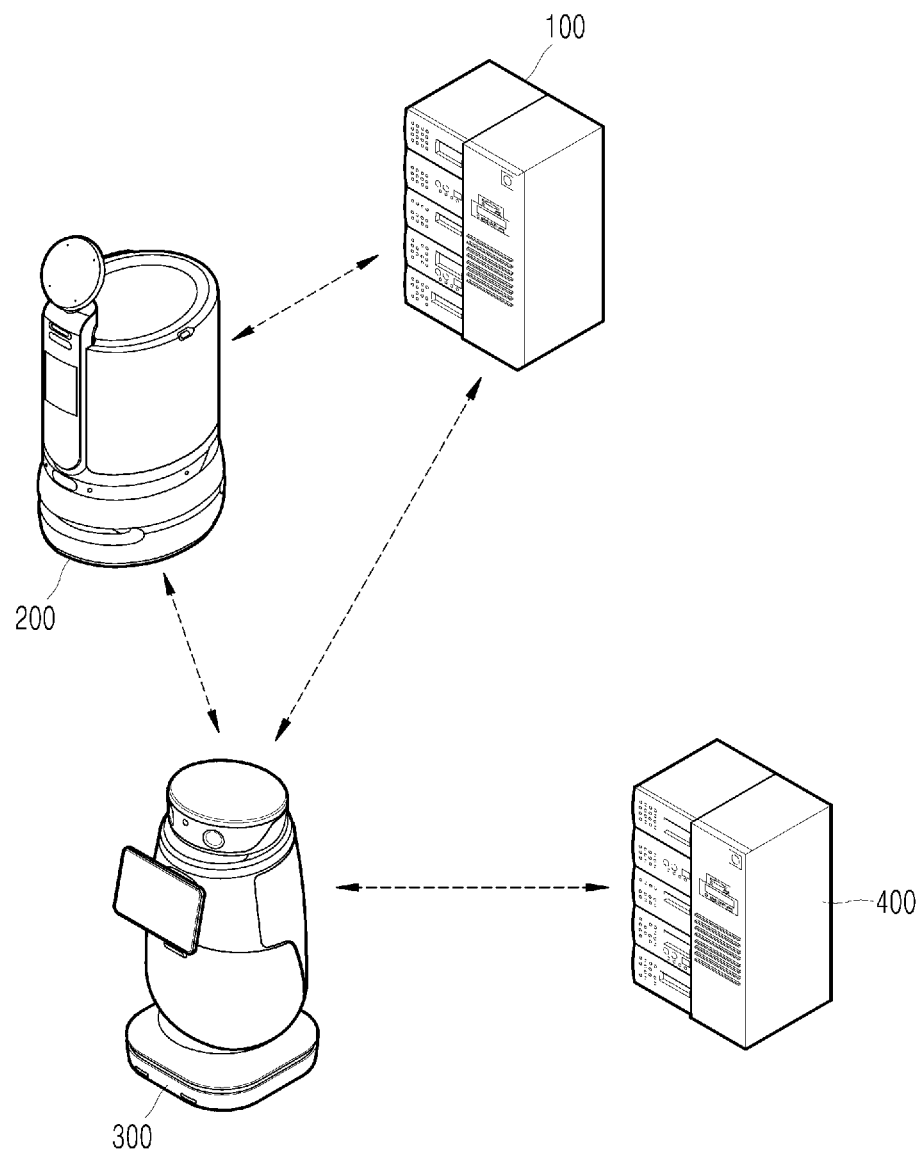
FIG. 1 is a schematic diagram of a robot system according to an embodiment of the present disclosure.

FIG. 1 is a schematic diagram of a robot system according to an embodiment of the present disclosure. The robot system according to this embodiment may be implemented for successfully delivering goods of a client's choice by using a first robot 200 configured to deliver the delivery goods, operating in conjunction with a second robot 300 operating at a delivery destination (such as the client's home or office).

The robot system in an embodiment may include a first server 100, a first robot 200, a second robot 300, and a second server 400, and may further include a user terminal 500 which will be described below.

The server 100 may be capable of communicating with the first robot 200 and may operate the first robot 200 by controlling the operation of the first robot 200.

The first robot 200 may be a delivery robot, which transports goods being delivered to a client, and brings the delivery goods to a delivery destination, such as the client's home, where the second robot 300 is located. The first robot 200 may include any form or structure as long as it is capable of carrying goods and traveling a certain distance, such as a vehicle and a drone. In addition, the first robot 200 may be provided in the plural, and the first server 100 may specify, from a plurality of first robots 200 operating at various locations, a first robot 200 required for delivery of particular goods.

For example, the first robot 200 may receive goods from a collection site of goods and move to a delivery destination by travelling a long distance. In another embodiment, when the delivery destination is an apartment or office building, the first robot 200 may be stationed at said apartment or office building and travel relatively short distances while carrying goods received from an external third delivery means. Further, the first robot 200 may be operated in various other ways, regardless of distance and form, as long as it is capable of carrying goods.

The first robot 200 may be registered on the first server 100 and deliver the delivery goods to a user according to information received from the first server 100. Accordingly, the first robot 200 and the first server 100 need to be communicably connected to each other, and to this end, the first server 100 may store information of the first robot 200.

Once the connection between the first server 100 and the first robot 200 is completed, the first robot 200 may receive and store client information required for delivery of delivery goods, such as personal information of the client and the address of the delivery destination. The first robot 200 may deliver the delivery goods to the delivery destination based on the stored client information.

The second robot 300 may receive the delivery goods from the first robot 200. The second robot 300 may be a robot operating at the delivery destination.

The second robot 300 may be a home robot stationed at the delivery destination, for example, at the home of the client, to provide the client with convenience. The second robot 300 may be used to receive the delivery goods from the first robot 200 at the delivery destination. Accordingly, the second robot 300 may be provided with various functions in order to receive the delivery goods. For example, the second robot 300 may be provided with the function to interact with the client, and to enable the interaction, the function to transfer information to the client and the function to recognize the client's command.

Further, to acquire information required for receiving the delivery goods, the second robot 300 may be capable of communicating with the servers 100 and 400, the first robot 200, and the user terminal 500.

Referring to FIG. 1, the second robot 300 may be, for example, a traveling robot which includes a body, a head unit rotatably coupled to the body, and a traveling unit coupled to the body.

Further, the second robot 300 may be provided with a speaker emitting a voice or a sound, a microphone receiving a voice or a sound, and a display displaying words or images.

However, the second robot 300 is not limited thereto, and may be of any form as long as it is capable of receiving, from the first robot 200, the delivery goods being delivered.

For example, the second robot 300 may travel a fixed distance from the delivery destination, meet the first robot 200, and receive goods from the first robot 200. Alternatively, the second robot 300 may only unlock a door lock at the delivery destination, while the first robot 200 is left to perform the remaining tasks up to placing the delivery goods at the delivery destination.

The second server 400 may have the second robot 300 registered thereon and operate the second robot 300. To operate the second robot 300, the second server 400 and the second robot 300 may be communicably connected with each other.

The second robot 300 may be communicably connected with the first server 100, and may receive, from the first server 100, information regarding the first robot 200, such as information indicating that the delivery goods the client has ordered have been shipped, detailed description of the delivery goods, detailed description of the first robot 200, and a detailed shipping schedule.

The first server 100 and the second server 400 may be identical to each other. That is, the first server 100 and the second server 400 may be integrated into a single server to simultaneously perform all the roles previously described for the first server 100 and the second server 400.

When the client is present at the delivery destination, the second robot 300 is capable of directly interacting with the client. Accordingly, the client may give a necessary command or input information to the second robot 300 by using a voice command or inputting a text command, or other methods. Further, the second robot 300 may output voice, text, or other signals that a client can visually or audibly recognize, to deliver necessary information to the client.

Accordingly, according to the embodiment illustrated in FIG. 1, in the robot system, for example, the second robot 300 and the client can exchange commands and information directly with each other.

Figure 2:
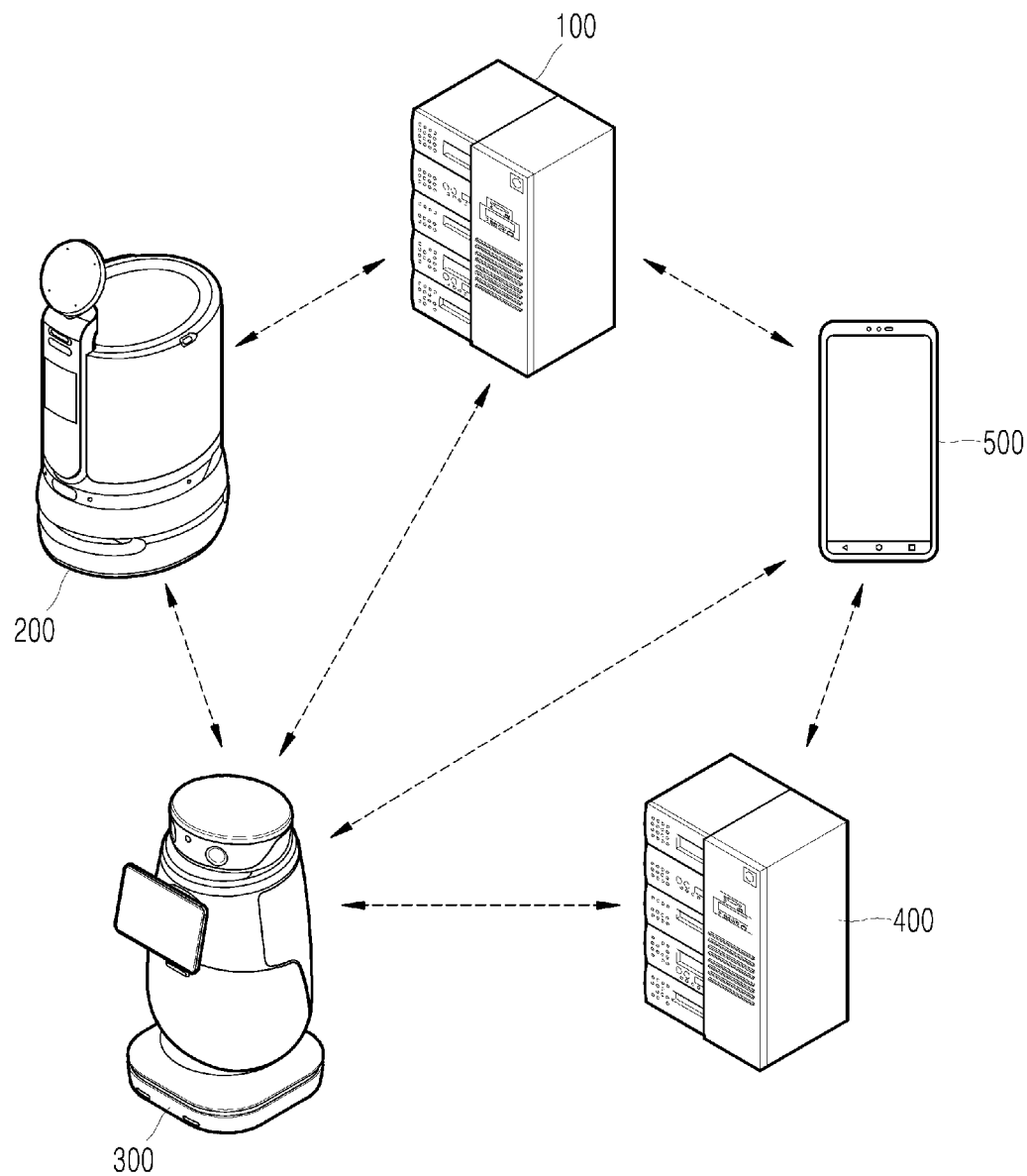
FIG. 2 is a schematic diagram of a robot system according to another embodiment of the present disclosure.

FIG. 2 is a schematic diagram of a robot system according to another embodiment of the present disclosure. As illustrated in FIG. 2, the robot system according to this embodiment may further include the user terminal 500. According to the embodiment illustrated in FIG. 2, the client can exchange, for example, commands and information directly with the second robot 300 through the user terminal 500.

The user terminal 500 may have the second robot 300 registered thereon and may be connected to the second robot 300 and the second server 400. For example, the user terminal 500 may be a smartphone or a tablet PC that is carried by the client.

The user terminal 500 may be communicably connected to the first server 100, and may receive, from the first server 100, information regarding the first robot 200, such as information indicating that the delivery goods the client has ordered have been shipped, detailed description of the delivery goods, detailed description of the first robot 200, and a detailed shipping schedule. Connection and communication between the user terminal 500 and the first server 100 may be realized as the client operates an application provided on the user terminal 500.

When the client is carrying the user terminal 500 and is present at the delivery destination, the second robot 300 may be connected to the user terminal 500 via a short-range communication means, such as Wi-Fi or Bluetooth communication means.

When the client is carrying the user terminal 500 and is present at delivery destination, it is appropriate to simply connect the second robot 300 and the user terminal 500 to each other by using a short-range communication means, and such a direct connection may be advantageous in terms of security. For example, the second robot 300 may be securely connected to the user terminal 500 via a WPA2 AES scheme.

The embodiment illustrated in FIG. 2 may be advantageously applied especially to interactions between the second robot 300 and the client when the client is unable to communicate with the second robot 300 directly due to being at a remote location, not at the delivery destination. That is, when the client is at a remote location away from the delivery destination, the client that carries the user terminal 500 is able to interact with the second robot 300 through the second server 400.

Meanwhile, an authentication means that is simple and fast, while being secure, may be appropriate for the connection between the second server 400 and the user terminal 500, in order to enhance convenience for the client. Accordingly, for example, by using Fast Identity Online (FIDO) authentication methods using fingerprint recognition, iris recognition, and other biometric recognition methods, the second server 400 and the user terminal 500 may be securely and conveniently connected to each other. Likewise, a FIDO authentication method may be used for the connection between the first server 300 and the user terminal.

In an embodiment, for smooth delivery of delivery goods, it may be necessary for the first robot 200 and the second robot 300 to interwork with each other. In an embodiment, the interworking between the second robot 300 and the first robot 200 may refer to a state of the second robot 300 and the first robot 200 being connected to each other so as to enable interactions required for delivery of delivery goods. For example, when the second robot 300 and the first robot 200 are communicably connected with each other, where they exchange real-time information with each other regarding their forms, operating features, real-time location information, and set scenarios required for transfer of goods, the second robot 300 and the first robot 200 can be regarded as interworking with each other.

When the second robot 300 and the first robot 200 are interworking with each other, delivery of delivery goods may be completed according to a set scenario. For example, the set scenario may refer to a detailed step-by-step scenario. Such a detailed step-by-step scenario may include the following: the first robot 200 carrying the delivery goods arrives at a delivery destination; the second robot 300 opens a door-lock of the delivery destination at the time of arrival of the first robot 200; when the first robot 200 enters the home at the delivery destination, the second robot 300 approaches the first robot 200 and receives the delivery goods from the first robot 200; and when the first robot 200 exits the home, the second robot 300 locks the door-lock.

The first robot 200 and the second robot 300 may include mobile communication modules, and through their respective mobile communication modules, the first robot 200 and the second robot 300 may communicate with each other, or with the first server 100, the second server 400, and the user terminal 500. Further, the first robot 200, the second robot 300, the first server 100, and the second server 400 may mutually transmit and receive information. Here, the mobile communication modules may transmit/receive wireless signals on mobile communication networks established according to technical standards or communication methods for mobile communications (for example, Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), and Long Term Evolution-Advanced (LTE-A)), and 5G (fifth generation) communication.

Likewise, the first server 100, the second server 400, and the user terminal 500 may be provided with the 5G communication module previously described. In this case, the first robot 200, the second robot 300, the first server 100, the second server 400, and the user terminal 500 can transfer data at 100 Mbps to 20 Gbps, and thus can transfer a large amount of audio or image data extremely rapidly. Likewise, the first server 100, the second server 400, and the user terminal 500 may more rapidly and more accurately recognize a large amount of audio or image data being transferred from the first robot 200 and the second robot 300.

The devices 100, 200, 300, 400, and 500 provided with a 5G communication module may each support various object intelligent communications (such as Internet of things (IoT), Internet of everything (IoE), and Internet of small things (IoST)), and the first robot 200 and the second robot 300 may support communications such as machine to machine (M2M) communication, vehicle to everything communication (V2X), and device to device (D2D) communication. Accordingly, the devices 100, 200, 300, 400, and 500 are each capable of efficiently sharing information obtainable in a space with various devices.

Figure 3:
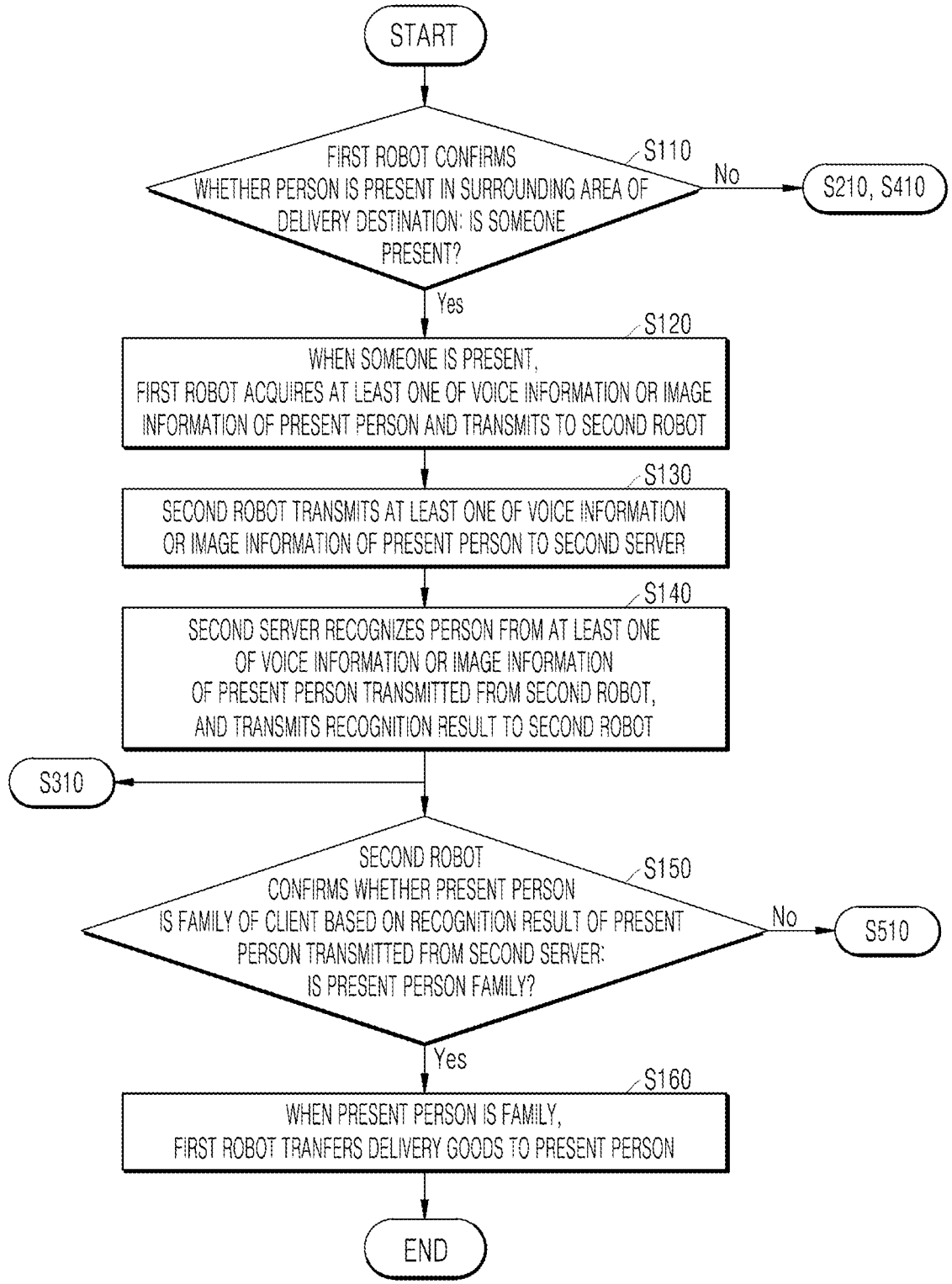
FIG. 3 is a flowchart of a robot system control method according to an embodiment of the present disclosure.

Hereinbelow, the control method for a robot system will be described in detail. FIG. 3 is a flowchart of a robot system control method according to an embodiment of the present disclosure.

Once the first robot 200 with delivery goods arrives at the delivery destination, the first robot 200 may search a surrounding area of the delivery destination to check for the presence of a person (S110).

In step S110, the first robot 200 may capture an image of the surrounding area of the delivery destination by using an image capturing means such as a camera, provided on the first robot 200. The surrounding area of the delivery destination may include, for example, an area in front of the door of the client's home or office, an area in front of the building if the delivery destination is a building, a hallway connected to the door of the client's home, and an elevator.

Here, the first robot 200 may search the surrounding area or capture an image thereof by using a camera such as a wide angle camera or a camera capable of rotating 360°, thereby increasing searching reliability. Further, the first robot 200 may acquire sounds generated in the surrounding area of the delivery destination by using, for example, a microphone provided on the first robot 200.

The first robot 200 may check for the presence of a person in the surrounding area through the acquired images and sounds. When a person is present, the first robot may acquire at least one of voice information or image information of the present person, and transmit the same to the second robot (S120). In step S120, the first robot 200 may acquire image information, such as a facial photograph, and voice information of the present person, and transfer the same to the second robot 300. If the present person is silent, the first robot 200 would be unable to acquire the voice information, and thus may transfer only the facial photograph to the second robot 300.

When a person is present in the surrounding area of the delivery destination is a third party, and not the client, a family member of the client, or an acquaintance of the client, the third party may represent a risk factor. That is, the third party may intrude into the place of the delivery destination or may seize the delivery goods during the delivery process of the delivery goods. In this context, embodiments of the present disclosure suggest a method of eliminating such a risk when a third party intervenes at the delivery destination immediately before completion of the delivery.

When the first robot 200 confirms that no one is present, further steps S210 and S410, which will be described below, may be carried out.

The second robot 300 may transmit at least one of voice information or image information of the person to the second server 400 (S130).

The second server 400 may recognize a person from the at least one of the voice information or the image information transmitted from the second robot 300, and transmit a recognition result to the second robot 300 (S140).

The recognition result is a result of the second server 400 determining, based on the transmitted voice information and image information of a person, who the person is. For example, the recognition results may be personal information if the present person is registered as a family member or acquaintance of the client. Alternatively, the recognition result may be "unknown" if the present person is an unregistered person.

The process of outputting the recognition result by the second server 400 may be implemented by an artificial intelligence technology. For example, the second server 400 may include an artificial intelligence module.

The artificial intelligence module compares the voice information transmitted from the second robot 300 with voice data stored in the second server 400, and when a degree of similarity is greater than or equal to a set value, the artificial intelligence module may output the information of a corresponding person as the recognition result. The second server 400 may transmit the recognition result to the second robot 300.

In another embodiment, the artificial intelligence module compares the image information transmitted from the second robot 300 with image data stored in the second server 400, and when a degree of similarity is greater than or equal to a set value, the artificial intelligence module may output the information of a corresponding person as the recognition result. The second server 400 may transmit the recognition result to the second robot 300.

Upon receiving the image information and voice information that the first robot 200 has acquired of the present person, the artificial intelligence module may compare the same to previously stored voice or image data of a family member or acquaintance of the client in order to determine a degree of similarity.

The artificial intelligence module according to embodiments may use a machine learning or deep learning network. Further, the artificial intelligence module may perform context awareness.

For example, the artificial intelligence module may determine whether what is searched from the inputted voice or image data is a person or an animal, and whether the present person is merely a passerby or someone likely to intervene in the delivery process.

The second server 400 may use the artificial intelligence module to output the recognition result from the inputted voice or image data. To output the recognition result, the second server 400 may perform sound processing or image processing, which processes an inputted voice or image.

The artificial intelligence module may include an inference engine, a neural network, and a probability model. Further, the artificial intelligence module may perform supervised learning or unsupervised learning based on various data.

Also, the artificial intelligence module may recognize a voice being inputted, and perform natural language processing to extract information therefrom.

Accordingly, through the various methods described above, the artificial intelligence module may compare the inputted voice or image to the previously stored voice or image of a family member of the client, and when a degree of similarity is greater than or equal to a preset value, may output the information of a corresponding person as the recognition result.

The second robot 300 may confirm whether a present person is a family member of the client, based on the recognition result of a person transmitted from the second server 400 (S150).

When the present person is a family member, the first robot 200 may deliver the delivery goods to the present person (S160). In an embodiment, step S160 may be performed since it is appropriate to limit reception of the delivery goods to a client and family members of the client, while it is inappropriate to have an acquaintance of the client receive the delivery goods. Accordingly, when the present person is not a family member, another step (S510), which will be described below, may be performed.

Alternatively, when a person is found to be present as a result of searching, the first robot 200 may deliver information regarding the present person to the client (S310). The processes related thereto will be described in greater detail below.

Figure 4:
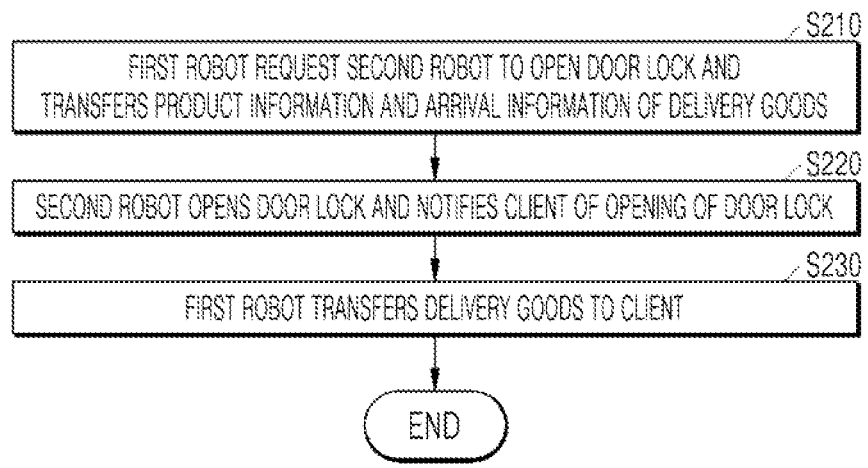
FIG. 4 and FIG. 5 are flowcharts of a robot system control method according to an embodiment of the present disclosure in a case when a client is present at a delivery destination.
Figure 5:
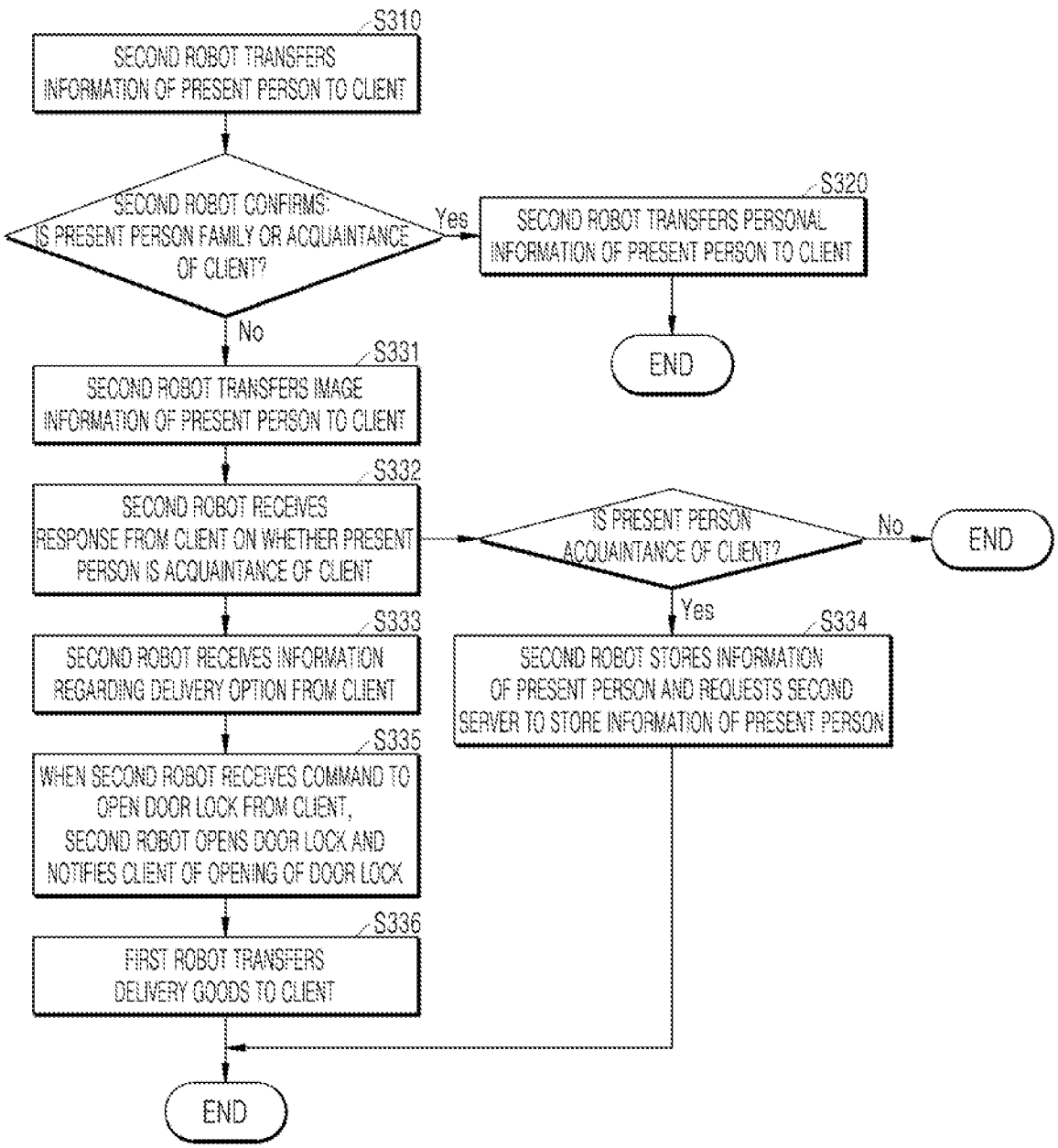

FIG. 4 and FIG. 5 are flowcharts of a robot system control method according to an embodiment of the present disclosure in a case when a client is present at the delivery destination. When the client is present at delivery destination, the client may select an appropriate interaction option between the first robot 200 and the client. That is, the client may interact with the first robot 200 by exchanging commands and information directly with the first robot 200, or may interact with the first robot 200 by exchanging commands and information through the user terminal 500.

Referring to FIG. 4, when the first robot 200 confirms that no one is in the surrounding area of the delivery destination, the first robot 200 may request the second robot 300 to open a door-lock at the delivery destination, and transmit product information and arrival information of the delivery goods (S210). Since there is no one in the surrounding area of the delivery destination who may represent a risk factor, the delivery of the delivery goods may be completed in an environment for which safety is secured.

Product information and arrival information of the delivery goods may be delivered to the client through the second robot 300, and the client may select an appropriate delivery option. For example, the client may authenticate opening of a door lock and select a delivery option that allows the second robot 300 to open the door lock and enter the home to deliver the delivery goods to the client.

In this case, the second robot 300 may open the door lock and notify the client of the opening of the door lock (S220). The second robot 300 may notify the client of the opening of the door lock through various methods, such as by sending a voice, an image, or a text message. For example, the second robot 300 may notify the client of opening of the door lock by sending a notification message to the user terminal 500 carried by the client, displaying on a display provided on the second robot 300, outputting a voice through a speaker provided on the second robot 300, or various other methods.

However, there may be situations in which the client is present at the delivery destination and yet is unable to directly interact with the second robot 300. For example, such situations may include situations when the second robot 300 is on the first floor inside the house while the client is on the second floor, or when the client is in a bathroom or toilet while the second robot 300 is outside the bathroom or toilet.

In this case, the second robot 300 is unable to use a display or a voice output to notify the client of opening of the door lock. Accordingly, in such a case, the second robot 300 may send a notification message or voice message to the user terminal 500 carried by the client, or may use an intercom or other notification means provided on the second floor, bathroom, or toilet where the client is present, to notify the client of opening of the door lock.

The first robot 200 may deliver the delivery goods to the client (S230). The first robot 200 may receive assistance from the second robot 300 or the client when delivering the delivery goods.

As another delivery option, the client may select an option that allows the client, not the second robot, to personally unlock the door lock to receive the delivery goods, or an option that allows the first robot 200 to unload the delivery goods at a third location, such as a security room and a warehouse.

Referring to FIG. 5, when the first robot 200 confirms that someone is present in the surrounding area of the delivery destination, the first robot 200 may transfer information of the present person to the client (S310). In step S310, the second robot 300 may determine whether the present person is a family member or an acquaintance of the client, and according to the determined result, may perform steps S320 and S331.

When the second robot 300 confirms that the present person is a family member or an acquaintance of the client, the second robot 300 may transfer personal information of the present person to the client (S320).

For example, the second robot 300 may directly convey to the client, via voice, "Product-delivering robot (the first robot 200) has notified us that Mr. or Mrs. '000' is here", or may send an image of such contents to the client, or may send information of such contents to the user terminal 500 carried by the client. The client may check such notifications directly from the second robot 300 or through the user terminal 500.

When the second robot 300 confirms that the present person is not a family member or an acquaintance of the client, the second robot 300 may transfer image information of the present person to the client (S331).

For example, the second robot 300 may show a video image of the present person to the client, along with a voice message "Product-delivering robot has notified us that a stranger is at the door. Please see the photo".

Next, the second robot 300 may receive, from the client, a response as to whether the present person is an acquaintance of the client (S332). The client may directly respond to the second robot 300, via a voice command, a text input, or other methods, whether the present person is an acquaintance of theirs. In another embodiment, the client may respond to the second robot 300 through the user terminal 500.

When the second robot 300 has confirmed with the client that the present person is an acquaintance of the client, the second robot 300 may store information of the present person, and request the second server 400 to store the information of the present person (S334). The information of the present person may include, for example, image information and voice information of the present person, and personal information such as a name and an address. Here, the personal information of the present person may be inputted to the second robot 300 by the client.

The second robot 300 and the second server 400 may store information on a new acquaintance, so that when delivering other delivery goods on another occasion or in other situations, the second robot 300 may recognize the new acquaintance as an acquaintance of the client, and perform necessary steps appropriate thereto.

The second robot 300 may receive information on a delivery option from the client (S333). The client may select an appropriate delivery option and transfer the same to the second robot 300, personally or through a terminal, and the first robot 200 and the second robot 300 may execute delivery and reception of the delivery goods according to the delivery option selected by the client. Here, the client may select an appropriate delivery option, considering factors such as whether or not someone has been determined to be present in the surrounding area of the delivery destination, and whether or not the present person is an acquaintance.

For example, the client may authenticate opening of a door lock and select the delivery option that allows the second robot 300 to open the door lock and enter the home to deliver the delivery goods to the client.

When the second robot 300 has received, from the client, a command to open the door lock, the second robot 300 may open the door lock and notify the client of the opening of the door lock (S335). The second robot 300 may notify the client of the opening of the door lock through various methods, such as by sending a voice, an image, or a text message. The first robot 200 may deliver the delivery goods to the client (S336). The first robot 200 may receive assistance from the second robot 300 or the client when delivering the delivery goods.

As another delivery option, the client may select an option that allows the client, not the second robot, to personally unlock the door lock to receive the delivery goods, or an option that allows the first robot 200 to unload the delivery goods at a third location, such as a security room and a warehouse.

Figure 6:
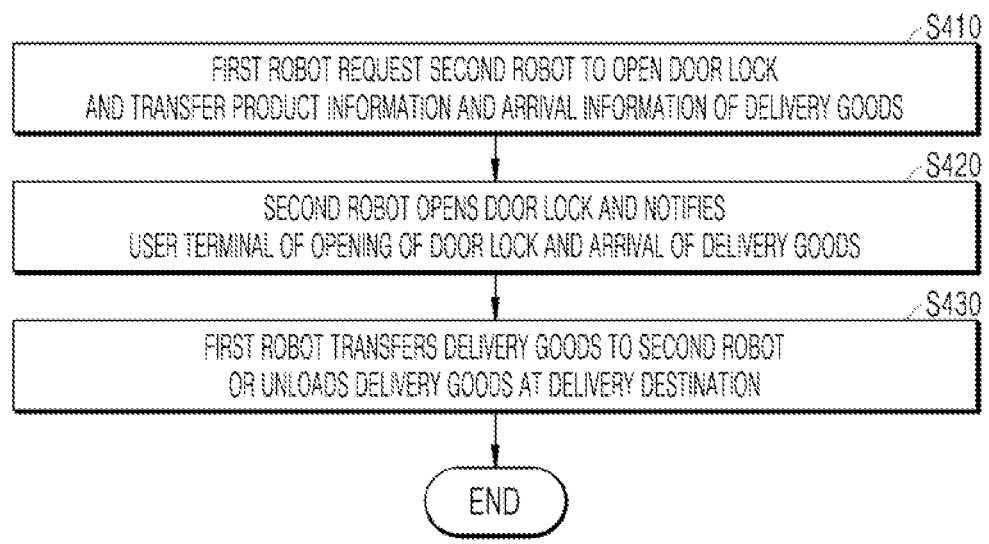
FIG. 6 to FIG. 8 are flowcharts of a robot system control method according to an embodiment of the present disclosure in a case when a client is present at a remote location, not at a delivery destination.
Figure 7:
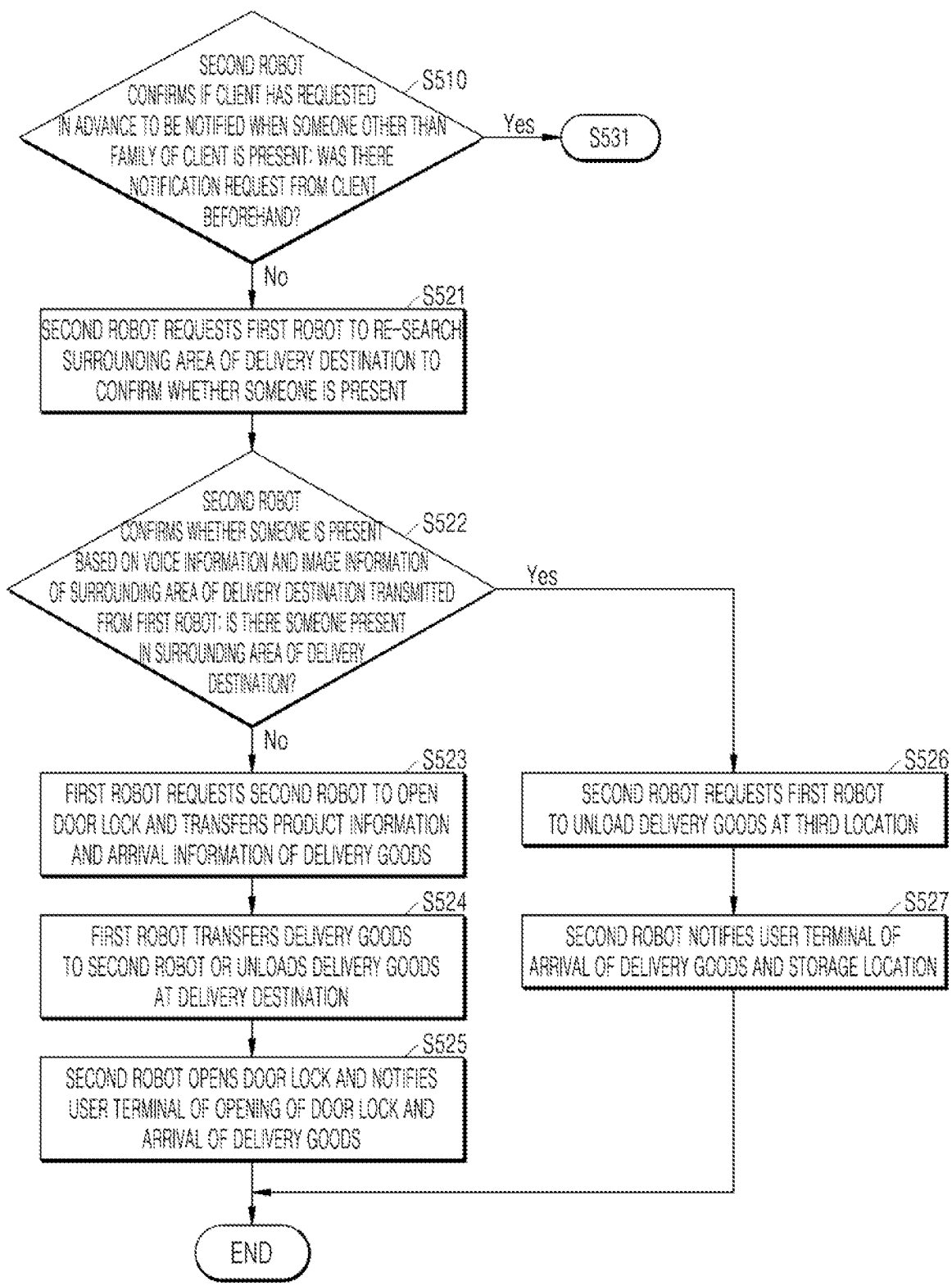
Figure 8:
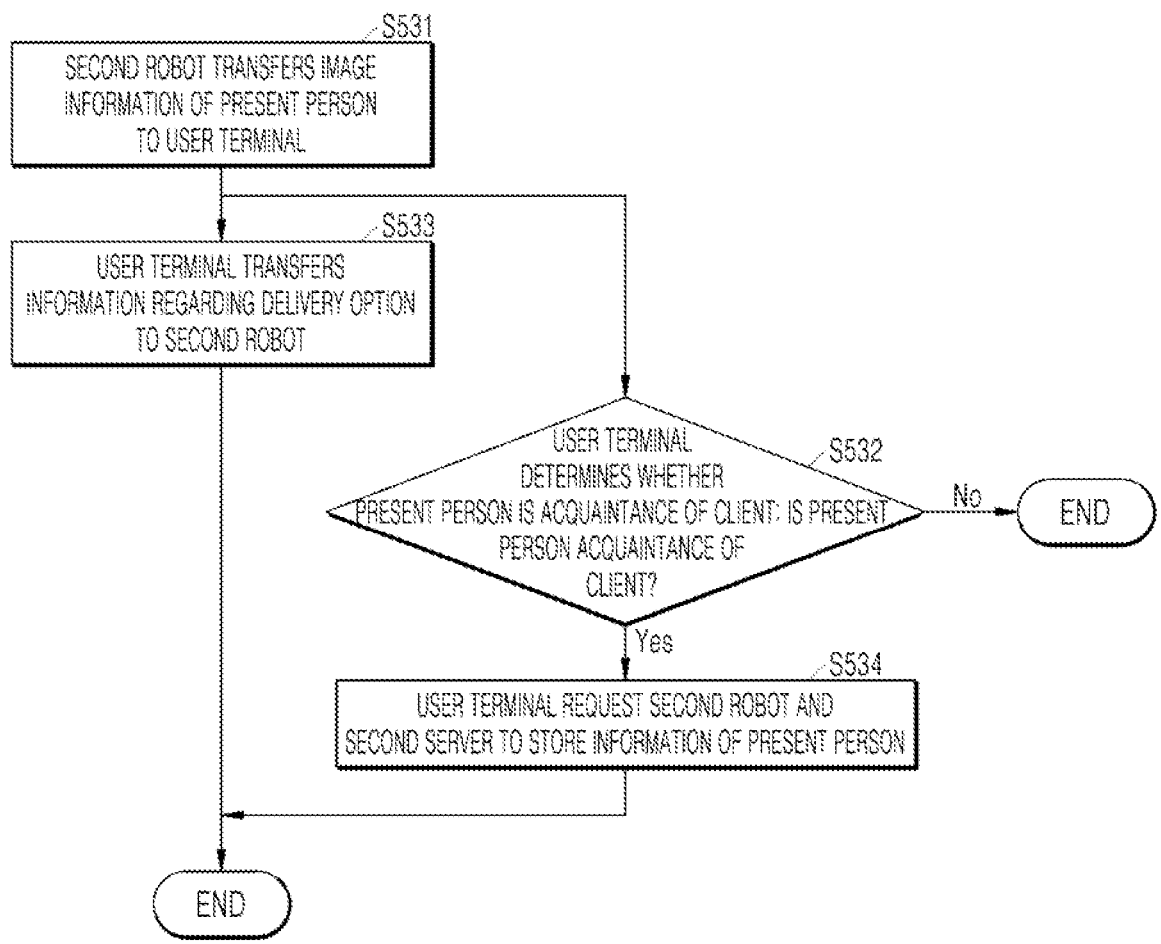

FIG. 6 to FIG. 8 are flowcharts of a robot system control method according to an embodiment of the present disclosure in a case when a client is present at a remote location, not at the delivery destination. When the client is at a remote location, it is difficult for the client to directly interact with the second robot 300 due to the physical distance, so in this case the client may interact with the second robot 300 through the user terminal 500.

When the client is at a remote location, it is difficult for the client to directly interact with the second robot 300, so in this case the client may interact with the second robot 300 through the second server 400. Accordingly, when the client is at a remote location, the client may interact with the second robot 300 through the user terminal 500 and the second server 400 to receive information and deliver commands regarding the delivery of the delivery goods.

Referring to FIG. 6, when the first robot 200 confirms that no one is present in the surrounding area of the delivery destination, the first robot 200 may request the second robot 300 to open the door lock at the delivery destination, and transfer product information and arrival information of the delivery goods (S410). Since there is no one in the surrounding area of the delivery destination who may represent a risk factor, the delivery of the delivery goods may be completed in an environment for which safety is secured.

In other embodiments, when the first robot 200 confirms that there is no one in the surrounding area of the delivery destination, the first robot 200 may transport and unload the delivery goods at a third location as requested by the client, such as a security room or a warehouse.

For example, when the client is at a remote location away from the delivery destination, the client may have the first robot 200 unload the delivery goods at a third location for the purposes of enhancing convenience, ensuring the safe delivery of the delivery goods, and preventing the risks associated with opening the door lock.

In this case, for example, through the user terminal 500, the client may command the second robot 300 to unload the delivery goods at a third location. Accordingly, steps S110, S526, and S527 may be performed subsequently.

The first robot 200 may search a surrounding area of the delivery destination (S110), and when nobody is present in the surrounding area of delivery destination, the first robot 200 may transmit product information and arrival information of the delivery goods to the second robot 300.

The second robot 300, having received the above information, may request the first robot 200 to unload the delivery goods at a third location (S526). The first robot 200, having received the above request, may unload the delivery goods at the third location, and the second robot 300 may notify the user terminal of the arrival and storage location of the delivery goods (S527).

Further, the second robot 300 may transfer the product information and arrival information of the delivery goods to the user terminal 500, and the client may confirm such information through the user terminal 500. The product information and arrival information of the delivery goods may include information such as the name, type, unit count, and arrival time of the delivery goods.

The second robot 300 may open the door lock and notify the user terminal 500 of the opening of the door lock and the arrival of the delivery goods (S420). The client, at a remote location, may confirm the opening of the door lock and the arrival of the delivery goods through the user terminal 500.

The first robot 200 may transfer the delivery goods to the second robot 300 or unload the delivery goods at the delivery destination (S430). Since there is no client or family member of the client to receive the delivery goods at the delivery destination, the first robot 200 and the second robot 300 may cooperate with each other to complete the delivery of the delivery goods. When the second robot 300 does not have a function to transport goods, the first robot 200 directly unloads the delivery goods at the delivery destination. When the second robot 300 does have a function to transport goods, the first robot 200 may transfer the delivery goods to the second robot 300.

Referring to FIG. 7, when the first robot 200 has confirmed that a person is present in the surrounding area of the delivery destination, and the second robot 300 has confirmed that the present person is not a family member, the second robot 300 may check whether the client has previously requested to be notified when someone other than his or her family member is present.

The client may input, in advance, a notification request to the second robot 300, and the second robot 300 may check whether the notification request has been inputted, before performing a subsequent step depending on whether or not the notification request has been inputted. When there has been no notification request from the client, another step S531, to be described below, may be performed.

When there has been no notification request in advance from the client, the second robot 300 may request the first robot 200 to re-search the surrounding area of the delivery destination to confirm whether a person is present (S521).

The first robot 200, having received a request to re-search, may search the surrounding area of the delivery destination by using, for example, a camera or a microphone, and when a person turns out to be present as a result of the search, the first robot 200 may transmit image information and voice information of the present person to the second robot 300. When no one is present, the first robot 200 may transmit, to the second robot 300, information indicating that no one is present.

The second robot 300 may confirm whether a person is present based on the voice information and the image information in the surrounding area of the delivery destination transmitted from the first robot 200.

When it is confirmed that no one is present, this would mean that the person who was there previously has left the surrounding area of the delivery destination, and that the risk factor no longer exists. When it is confirmed that there still is someone present, the risk factor still exists. In each scenario, the following processes may be carried out to ensure the completion of delivery of the delivery goods.

In a scenario in which the second robot 300 has confirmed that there is no one present in the surrounding area of the delivery destination, steps identical or similar to those previously described, S410, S420, and S430, may be carried out.

In particular, the first robot 200 may request the second robot 300 to open a door lock, and transfer product information and arrival information of the delivery goods to the second robot 300 (S523). The first robot 200 may transfer the delivery goods to the second robot 300 or unload the delivery goods at the delivery destination (S524).

The second robot 300 may open the door lock and notify the user terminal 500 of the opening of the door lock and the arrival of the delivery goods (S525).

When the second robot 300 has confirmed, as a result of re-searching, that someone is present in the surrounding area of the delivery destination, then the delivery goods may need to be delivered to and stored at a safe third location, such as a security room or a warehouse, to avoid any risk factors.

Accordingly, in this case, the second robot 300 may request the first robot 200 to unload the delivery goods at the third location (S526).

As requested by the second robot 300, the first robot 200 may unload the delivery goods at the designated third location.

The second robot 300 may notify the user terminal 500 of the arrival and store the location of the delivery goods (S527).

The client may receive, through the user terminal 500, the storage location of the delivery goods, and receive the delivery goods at a later time.

Referring to FIG. 8, when there has been a notification request in advance from the client, the second robot 300 may transmit the image information of the present person to the user terminal 500 (S531).

The user terminal may transfer the information regarding delivery option to the second robot 300 (S533).

The client, upon being made aware of the arrival of the delivery goods by the user terminal 500, may transfer a selected delivery option to the second robot 300 through the user terminal 500. The delivery option may be, for example, an option that allows for opening a door lock at the delivery destination to complete reception of the delivery goods between the first robot 200 and the second robot 300, or an option that allows the first robot 200 to unload the delivery goods at a third location.

Meanwhile, the user terminal 500 may determine whether the present person is an acquaintance of the client (S532). For example, the client may see the image of the present person transmitted to the user terminal 500 to determine whether the present person is an acquaintance, and then, through the user terminal 500, may input their response to the user terminal 500.

When the user terminal 500 has determined that the present person is an acquaintance of the client, the user terminal 500 may request the second robot 300 and the second server 400 to store information of the present person (S534). The information of the present person may include, for example, image information and voice information of the present person, and personal information such as a name and an address. Here, the personal information of the present person may be inputted to the second robot 300 by the client.

The second robot 300 and the second server 400 may store information on a new acquaintance, so that when delivering other delivery goods on another occasion or in other situations, the second robot 300 may recognize the new acquaintance as an acquaintance of the client, and perform necessary steps appropriate thereto.

According to embodiments of the present disclosure, the first robot 200 and the second robot 300 may interwork with each other to perform actions in correspondence with each other over a course of time, thus ensuring smooth and effective delivery of delivery goods.

According to the embodiments, whether or not someone is present in the surrounding area of the delivery destination, the first robot 200 and the second robot 300 may operate in an appropriate manner for each circumstance, and thus the time, costs and efforts associated with the delivery of the delivery goods may be reduced.

According to the embodiments, when a person is present in the surrounding area of the delivery destination, it is assessed whether said person may poses a risk to the delivery of the delivery goods and the safety of the client, and an effective response may be made based on the result of such assessment may be effectively managed according to the result of such assessment.

Although embodiments of the present disclosure have been described, the present disclosure is not limited to the described embodiments. Instead, the technical features of the embodiments previously described, unless incompatible with each other, may be combined in various ways to provide other embodiments.

What is claimed is:

1. A control method for a robot delivery system comprising:
   determining, via a first robot, whether a person is present at a surrounding area of a delivery destination, wherein the first robot is tasked with delivering a package to a client at the delivery destination;
   acquiring, via the first robot, at least voice information or image information of a present person based on a determination that the present person is present at the surrounding area of the delivery destination, transmitting the at least voice information or image information from the first robot to a second robot operating at the delivery destination;
   transmitting to a server, by the second robot, the at least voice information or image information; performing recognition, by the server, based on the at least voice information or image information received from the second robot;
   transmitting a recognition result from the server to the second robot; and confirming, by the second robot, whether the present person is a family member or an acquaintance of the client based on the recognition result received from the server.

2. The control method of claim 1, further comprising delivering, by the first robot, the package to the present person when the present person is confirmed as a family member of the client by the second robot.

3. The control method of claim 1, wherein the server is configured to utilize an artificial intelligence module, wherein the artificial intelligence module is configured to determine a similarity between voice information received from the second robot with stored voice data and to output information of a corresponding person when a degree of similarity between the voice information and one of the stored voice data is greater than or equal to a set value.

4. The control method of claim 1, wherein the server is configured to utilize an artificial intelligence module, wherein the artificial intelligence module is configured to determine a similarity between image information received from the second robot with stored image data, and to output information of a corresponding person when a degree of similarity between the image information and one of the stored image data is greater than or equal to a set value.

5. The control method of claim 1, wherein when it is determined that no person is present at the surrounding area of the delivery destination, the method further comprises:
   transmitting, by the first robot: a request to the second robot to open a door lock of the delivery destination; and product information and arrival information of the package.

6. The control method of claim 5, further comprising:
   opening the door lock by the second robot in response to the request to open the door lock;
   transmitting, by the second robot, a notification to the client of the opening of the door lock; and
   delivering, by the first robot, the package to the client.

7. The control method of claim 1, wherein when it is confirmed that the present person is a family member or acquaintance of the client, the method further comprises transmitting, by the second robot, personal information of the present person to the client.

8. The control method of claim 1, wherein when the second robot confirms that the present person is not a family member or an acquaintance of the client, the method further comprises:
   transmitting, by the second robot, image information of the present person to the client;
   receiving, by the second robot, a response as to whether the present person is an acquaintance of the client; and
   receiving, by the second robot, information regarding a delivery option based on the response.

9. The control method of claim 8, wherein when the second robot confirms that the present person is an acquaintance of the client based on the received response, the method further comprises storing, by the second robot, information of the present person and transmitting a request to the server to store the information of the present person.

10. The control method of claim 8, wherein when the received information regarding the delivery option comprises a command to open a door lock of the delivery destination, the method further comprises:
    opening the door lock by the second robot;
    transmitting, by the second robot, a notification to the client of the opening of the door lock; and
    delivering, by the first robot, the package to the client.

11. The control method of claim 5, further comprising:
    opening the door lock, by the second robot, in response to the request to open the door lock;
    transmitting, by the second robot, a notification to a user terminal of the opening of the door lock, wherein the second robot is registered with the user terminal; and
    delivering, by the first robot, the package to the second robot or unloading the package at the delivery destination.

12. The control method of claim 1, wherein when the present person is confirmed as not being a family member of the client, the method further comprises determining, by the second robot, whether the client has requested in advance to be notified when a non-family person is present at the surrounding area of the delivery destination.

13. The control method of claim 12, wherein when it is determined that the client has not requested in advance to be notified, the method further comprises:
    transmitting, by the second robot, a request to the first robot to search the surrounding area of the delivery destination to determine again whether a person is still present at the surrounding area; and
    transmitting, by the first robot, additional voice information or additional image information of the surrounding area of the delivery destination to the second robot.

14. The control method of claim 13, further comprising:
    confirming, by the second robot, that no one is present at the surrounding area of the delivery destination based on the additional voice information or additional image information transmitted by the first robot;
    transmitting, by the first robot, a request to the second robot to open a door lock of the delivery destination and product information and arrival information of the package;
    delivering, by the first robot, the package to the second robot or unloading the package at the delivery destination; and
    transmitting, by the second robot, a notification to a user terminal of opening of the door lock and delivery of the package, wherein the second robot is registered with the user terminal.

15. The control method of claim 13, further comprising:

confirming, by the second robot, that a person is still present at the surrounding area of the delivery destination based on the additional voice information or the additional image information transmitted by the first robot;

transmitting, by the second robot, a request to the first robot to unload the package at another location; and transmit, by the second robot, a notification to a user terminal of delivery of the package to the another location, wherein the second robot is registered with the user terminal.

16. The control method of claim 12, wherein when it is determined that the client requested in advance to be notified, the method further comprises:

transmitting, by the second robot, the at least image information of the present person to a user terminal, wherein the second robot is registered with the user terminal;

determining, at the user terminal, whether the present person is an acquaintance of the client; and transmitting, by the user terminal, information to the second robot regarding a delivery option based on the determination of whether the present person is an acquaintance.

17. The control method of claim 16, further comprising transmitting, by the user terminal, requests to the second robot and the server to store information of the present person when it is determined that the present person is an acquaintance of the client.

\* \* \* \* \*